United States Patent [19]
Sali et al.

[11] Patent Number: 5,471,413
[45] Date of Patent: Nov. 28, 1995

[54] FAST ADDER CHAIN

[75] Inventors: Luigi M. Sali, St.Angelo Lodigiano; Carla Golla, Sesto S.G., both of Italy

[73] Assignee: SGS-Thomson Microelectronics S.A., Pouilly, France

[21] Appl. No.: 66,567

[22] Filed: May 25, 1993

[30] Foreign Application Priority Data

May 27, 1992 [EP] European Pat. Off. .............. 92830268

[51] Int. Cl.$^6$ .................................................. G06F 7/52
[52] U.S. Cl. .................................................. 364/786
[58] Field of Search .................................. 364/784, 786, 364/768, 787

[56] References Cited

U.S. PATENT DOCUMENTS

| | | | |
|---|---|---|---|
| 4,369,500 | 1/1983 | Fette | 364/786 |
| 4,660,165 | 4/1987 | Masumoto | 364/787 |
| 4,683,548 | 7/1987 | Mlynek | 364/786 |
| 5,036,483 | 7/1991 | Virtue | 364/786 |
| 5,175,703 | 12/1992 | Ong | 364/786 |

FOREIGN PATENT DOCUMENTS

0391516  10/1990  European Pat. Off. .

OTHER PUBLICATIONS

IBM Technical Disclosure Bulletin, vol. 17, No. 1, Jun. 1974, New York, U.S., pp. 118–119, J. Beraud, "High–Speed Accumulator".

Proceedings of the 1990 IEEE International Symposium on Circuits and Systems, 1–3 May, 1990, New Orleans, La., USA, vol. 2, IEEE, New York, USA, pp. 982–986, T. Noll, "Carry–Save Arithmetic for High–Speed Digital Signal Processing".

Computer Journal, vol. 29, No. 6, Dec. 1986, London, GB, pp. 495–499, W. Clocksin, "Automatic Specialisation of Standard Design".

K. Hwang, "Computer Arithmetic", 1979, J. Wiley & Sons, New York, U.S., pp. 40–43.

IEE Proceedings G. Electronic Circuits & Systems, vol. 133, No. 5 Oct. 1986, Stevenage GB pp. 256–264, H. Yung et al., "Recursive addition and its parameterisation in VLSI".

IEEE Journal of Solid–State Circuits, vol. 23, No. 2, Apr., 1988 New York U.S. pp. 573–580, C. Ekroot "A GaAs 4–bit Adder–Accumulator Circuit for Direct Digital Synthesis".

*Primary Examiner*—David H. Malzahn
*Attorney, Agent, or Firm*—Wolf, Greenfield & Sacks

[57] ABSTRACT

A fast adder chain for adding together at least one pair of digital words and including a plurality of cascade connected adder blocks. Each block including adders for obtaining the pseudosum of portions of the digital word pair and latches for storing and transmitting the pseudosum to the next block and the pseudocarry from each adder to the chain end.

12 Claims, 5 Drawing Sheets

FAST ADDER CHAIN

BACKGROUND OF THE INVENTION

1. Field of the Invention

This invention relates to a fast adder chain. More particularly, the invention relates to an adder chain which is operative to add together at least one pair of digital words and includes a plurality of adder blocks in cascade arrangement.

2. Discussion of the Related Art

As is well known, adder chains are used in a variety of circuit arrangements designed to meet a range of different applicational demands. A typical example of their utility is related to FIR Finite Impulse Response filters, wherein the adders are adapted to implement part of the transfer function which is characteristic of the filter.

A number of prior art adder chains are known in the art. Such prior art adder chains have a common drawback in that they are all quite slow in yielding the result of the sum operation. Some of these prior approaches have been described in detail in Joseph Cavanagh's "Digital Computer Arithmetics", published by McGraw-Hill.

For completeness of discussion, briefly reviewed herein below are the most commonly adopted solutions to the problem of providing N-bit parallel adders for two's complement, fixed point numbers. A first adder is known as the "Look-Ahead Carry" type and is effective to simultaneously input carries to each block at the location of each bit. The carries are generated from three count levels, whereas the sum is obtained from two levels.

It follows that the maximum propagation delay will be equal to five clock impulses. However, the final carry requires a logic AND gate with N+1 inputs, which can only be implemented by a network of cascade-connnected gates. It can be appreciated that this involves additional delay in the signal propagation.

Another adder, known as the "Select Carry" type, has a structure in which the operands are divided into groups, and each group is implemented using the same logic as in the first adder above. This second adder is not particularly fast, and requires highly complex circuitry.

A third prior approach, referred to as the "By-Pass Carry", attempts to reduce the time required to generate the sum by speeding up the carry determining operation for the carry to be input to a given cell. For this purpose, an overriding step is provided for the carry to override one chain stage when either operand already has a logic value of one at the given location. The attainable rate with such an approach is not a significantly fast one.

A further type of adder is that known in the art as "Carry Save Adder" or "pseudoadder", and includes a combination network which, when input three numbers of N bits each, will output two more N-bit numbers referred to as the "pseudosum" and "pseudocarry". This prior art adder requires a final stage to add the pseudosum and pseudocarry together, with the pseudocarry suitably shifted one position.

In summary, all of the prior art adders have the disadvantage of being quite slow in performing the sum operation despite the different forms in which they have been embodied. Further, such adders include considerable circuit complexity, which greatly increases the integrated circuit area that must be devoted to the sum operation.

The underlying technical problem solved by this invention is to provide an adder chain which has such structural and functional characteristics as to allow the sum operation to be performed at a very fast rate, and with reduced silicon area requirements, thereby overcoming the limitations of the prior art.

SUMMARY OF THE INVENTION

The solution provided by this invention includes propagating the carry only once to the end of the adder chain. Based on this invention, the technical problem is solved by an adder chain including a plurality of adder blocks arranged in cascade. Each adder block includes adders, receiving portions of first and second digital words to be added together, and computing a pseudosum and a pseudocarry for the received portions of the first and second digital words. Latches are coupled to the adders and store the pseudosum and transmit the pseudosum to a subsequent block and the pseudocarry to a subsequent block.

BRIEF DESCRIPTION OF THE DRAWINGS

Other features and the advantages of an adder chain according to the invention will become apparent from the following detailed description of an embodiment thereof, given by way of a non-limiting example with reference to the accompanying drawings.

In the drawings.

DETAILED DESCRIPTION

Figure 1:
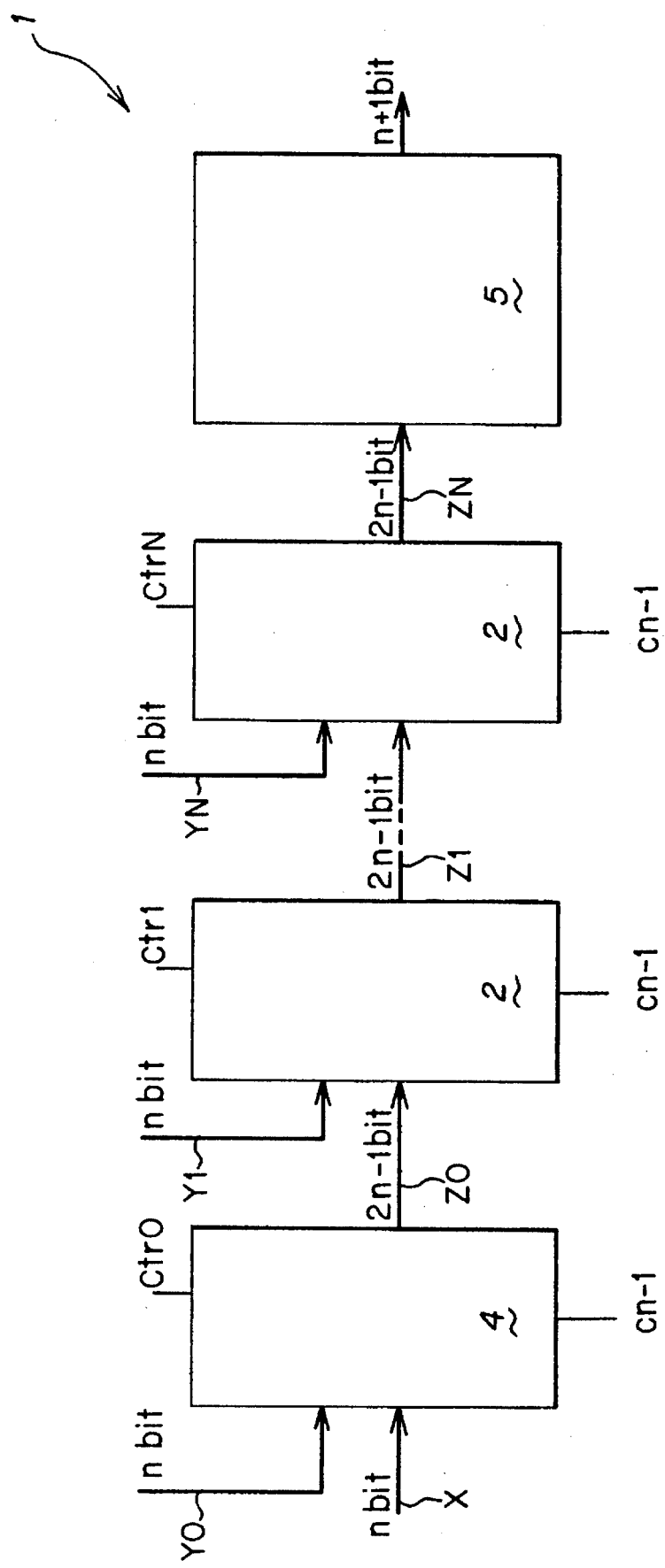
FIG. 1 is a block diagram of an adder chain embodying the invention.

With reference to the drawing views, generally and schematically shown at 1 is an adder chain embodying this invention. This chain 1 is particularly, though not solely, intended for incorporation in a digital filter of the FIR type, not shown.

The chain 1 structure includes a plurality of N adder or sum blocks 2 centrally disposed therein, which correspond in number to the number of words to be added. Also provided are an initial block 4 and a final block 5 for computing and presenting the sum in explicit form. The adder blocks are shown connected in cascade in which an initial block 4 receives inputs X and Y0 and provides an output Z0 which is connected to an input of a subsequent block 2. The subsequent block produces an output Z1 which is, in turn, connected to an input of a further subsequent block 2; and so on up to and including connection of the final block 5.

Figure 2:
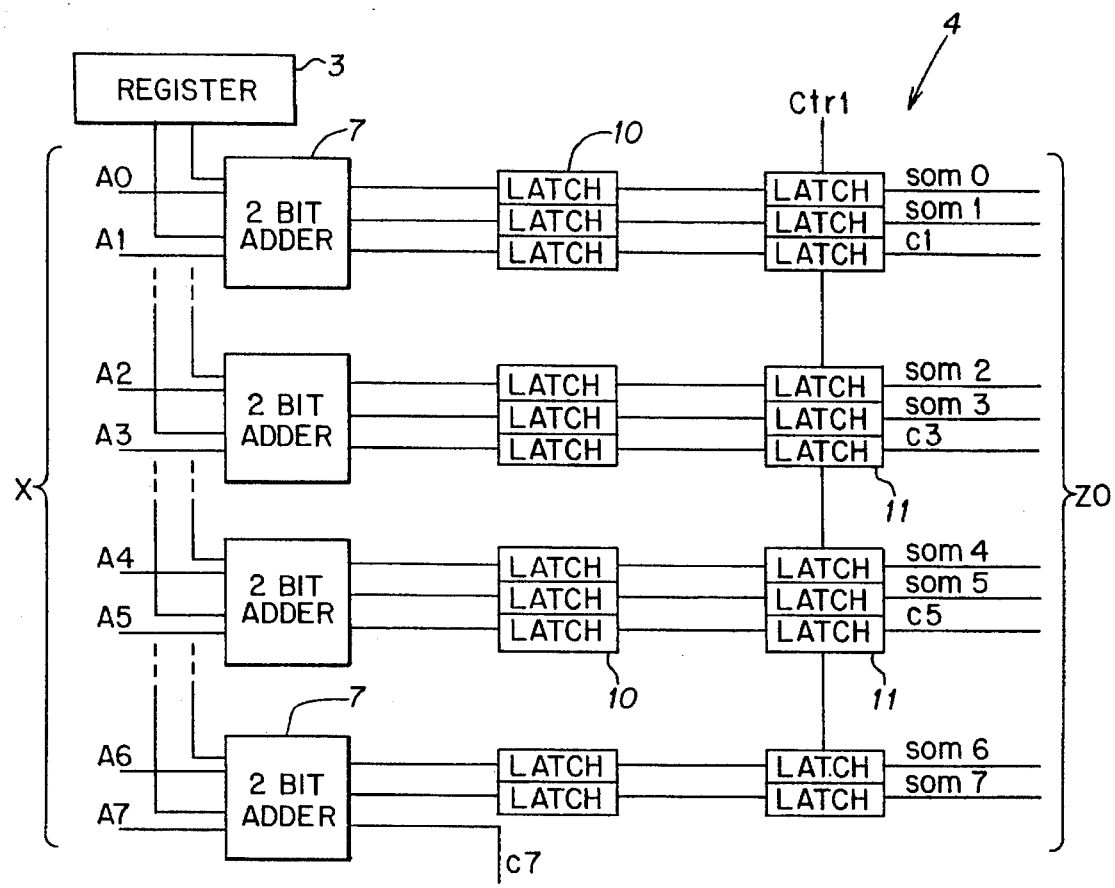
FIG. 2 is a detailed block diagram showing a detail of a first adder or sum block of the chain of FIG. 1.

The initial block 4 is shown in FIG. 2 to include a group of adders 7, each being input pairs of words, with each word including two bits in this example. Specifically, such words are two-bit portions of the digital words to be added together which, in the embodiment being discussed herein by way of illustration only, are composed of n=8 bits each. Thus, block 4 includes a number of adders 7 equal to n/2, which are arranged in parallel and each are provided with respective input pairs for receiving digital signals corresponding to the aforesaid portions of the words to be added.

Accordingly, each adder 7 is input two digital signals $A_i$ and $A_{i+1}$, which correspond to two bits of a first digital word X, and two other digital signals $B_i$ and $B_{i+1}$, which correspond to another pair of bits of a second word YO to be added to the first word X. It should be understood that the bit pairs occupy the same and homolog positions in the respective words X and YO. The signals related to the second word YO are picked up from a register, indicated at 3. The word X is alternately used to allow several digital filters incorporated within the chain 1 of this invention to be cascade connected, as described above.

Figure 4:
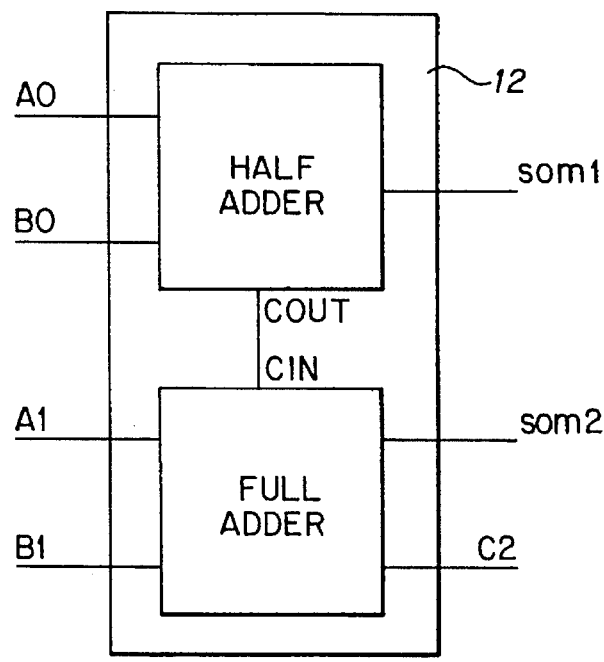
FIGS. 4 and 5 show respective examples of adders as incorporated in blocks of the chain of FIGS. 2 and 3.

The construction of each adder 7 is shown in FIGS. 4, 5, 6 and 7 to include respective cells wherein the combinations of two full adders FA, or two half adders HA, or even one full adder and one half adder, are proposed. For example, FIG. 4 shows a first type of HA-FA combination which is input two words A0, A1 and B0, B1, each of two bits, and outputs two sums Som1, Som2 as well as the carry C2 for provision to a second cell.

Figure 5:
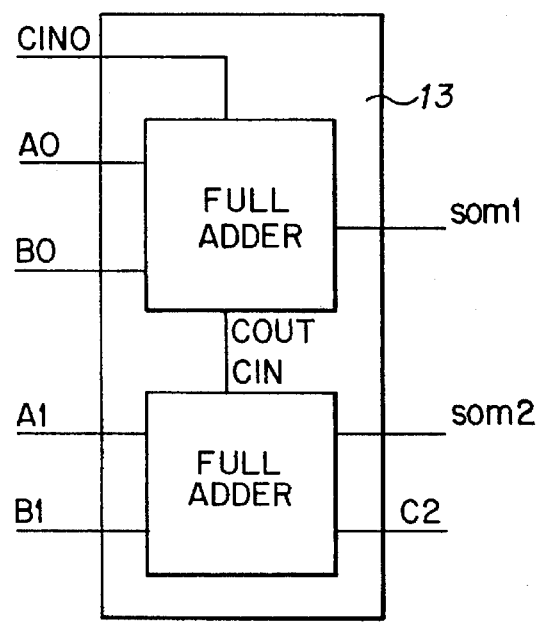

Shown in FIG. 5 is, alternately, a combination 13 of a full adder being input two words $A_0$, $A_1$ and $B_0$, $B_1$, each of two bits, and a carry CIN0 from a preceding sum, e.g. the carry C2 from the adder combination of FIG. 4.

Figure 6:
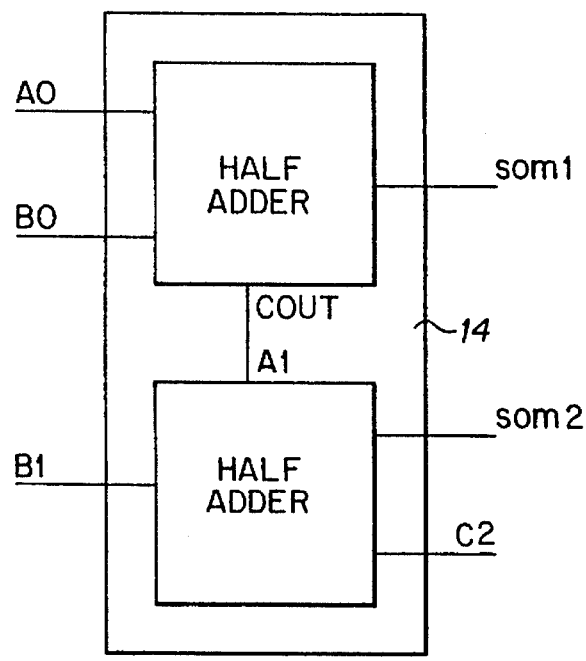
FIGS. 6 and 7 show further examples of adders incorporated in the blocks in the chain of the present invention, shown in FIGS. 2 and 3; and, FIG. 8 is a detailed block diagram of an end block of the chain of FIG. 1.

A third alternate adder combination 14 is shown in FIG. 6 and includes the combination of two half adders, with three inputs, a two-bit word, and a carry from a preceding sum. The outputs of this adder are similar to the embodiment of FIG. 5.

Figure 7:
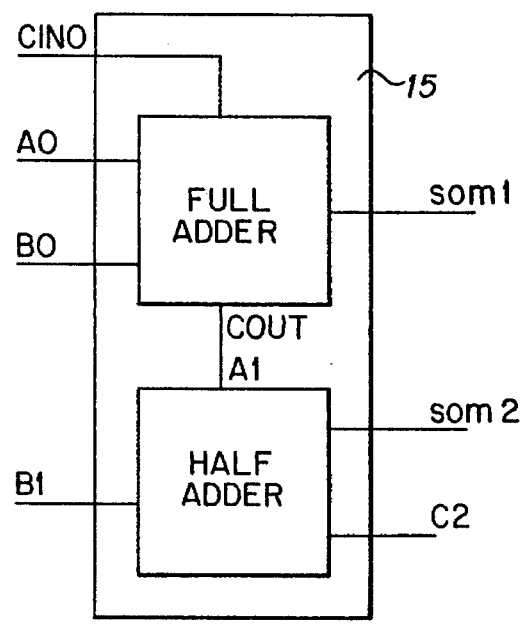

Lastly, the alternate embodiment of FIG. 7 shows an FA-HA combination 15 with four inputs, of which three have the same "weight" and one CIN0 relates to a higher weight carry. The above described three cells form essentially a parallel "Ripple-Carry" adder for two-bit words.

Within each cell, the HA and/or FA adder pairs are interlinked to transfer the carry produced in the first pseudosum operation performed internally. Within the chain 1, the above cells are utilized as appropriate and required in the various blocks 2, 4 and 5.

The construction of the initial block 4 further includes a plurality of storage elements 10, referred to as "latches" hereinafter. Specifically, the latches are of the so-called master-slave type and are provided in the number of (3n/2–1). A latch 10 is arranged, in fact, after each output, somi or ci, of the adders 7, and receives the output thereof, except for the output cn-1 of the last adder in each block 2 or 4. The last-named output represents the n-th carry and should be cleared for shifting the carry one position, toward the most significant bit, in order for the result to be correct.

A similar group of (3n/2–1) latches 11, again of the master-slave type, are provided after the previously mentioned latches 10 and are connected thereto. These latches 11 are dual selection ones linked operatively to a control signal Ctr0, which may allow the signal to override the latch. The latches 11 effectively form special symmetrical F.I.R. filters. The outputs of latches 11 are denoted in the drawings by the symbols somi and ci, depending on whether they relate to the i-th pseudosum or pseudocarry bit, respectively, from the operation performed in block 4.

Figure 3:
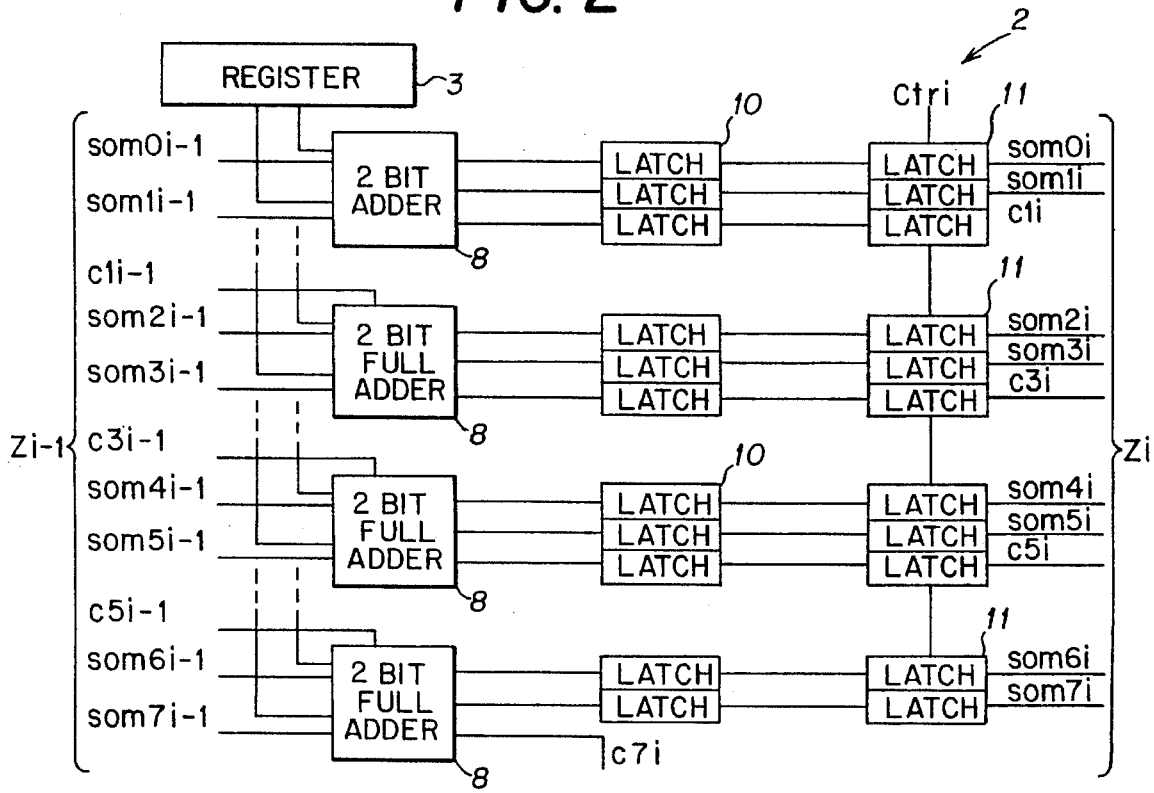
FIG. 3 is a detailed block diagram of a generic i-th adder or sum block of the chain of FIG. 1.

The constructions of the N blocks 2 located centrally in the chain will be discussed in detail below with reference to FIG. 3. Each i-th block 2 is input a digital word $Y_i$ of n bits read from the register 3, and on the other side, the digital output $Z_{i-1}$ from the adder block preceding it. This output $Z_i$ includes 2n-1 bits. The words $Y_i$ and $Z_{i-1}$ are input, however, as portions made up of two bits each, which are applied to respective two-bit adder blocks 8, Each block 2 includes a number of adders at least equal to n/2. The first adder 8 in the i-th block 2 includes a cell 12 of the kind shown in FIG. 4, whereas the other two-bit adders 8 are of the kind indicated by 13 in FIG. 5 and are input the carry from the two-bit sum performed in the preceding block 2 at the corresponding same location. Similar to block 4, each block 2 is provided with plural latches 10 placed after each of the adders 8, receiving the outputs of the adders 8, except for the carry cn-1 output of the last adder.

Further dual-selection latches 11, linked operatively to a control signal Ctri, are cascade connected to the former latches 10, and their functions will be explained hereinafter.

The construction of the final block 5 is described below and, which is adapted to perform and present on an output U the explicit computation of the sum of the digital words.

Figure 8:
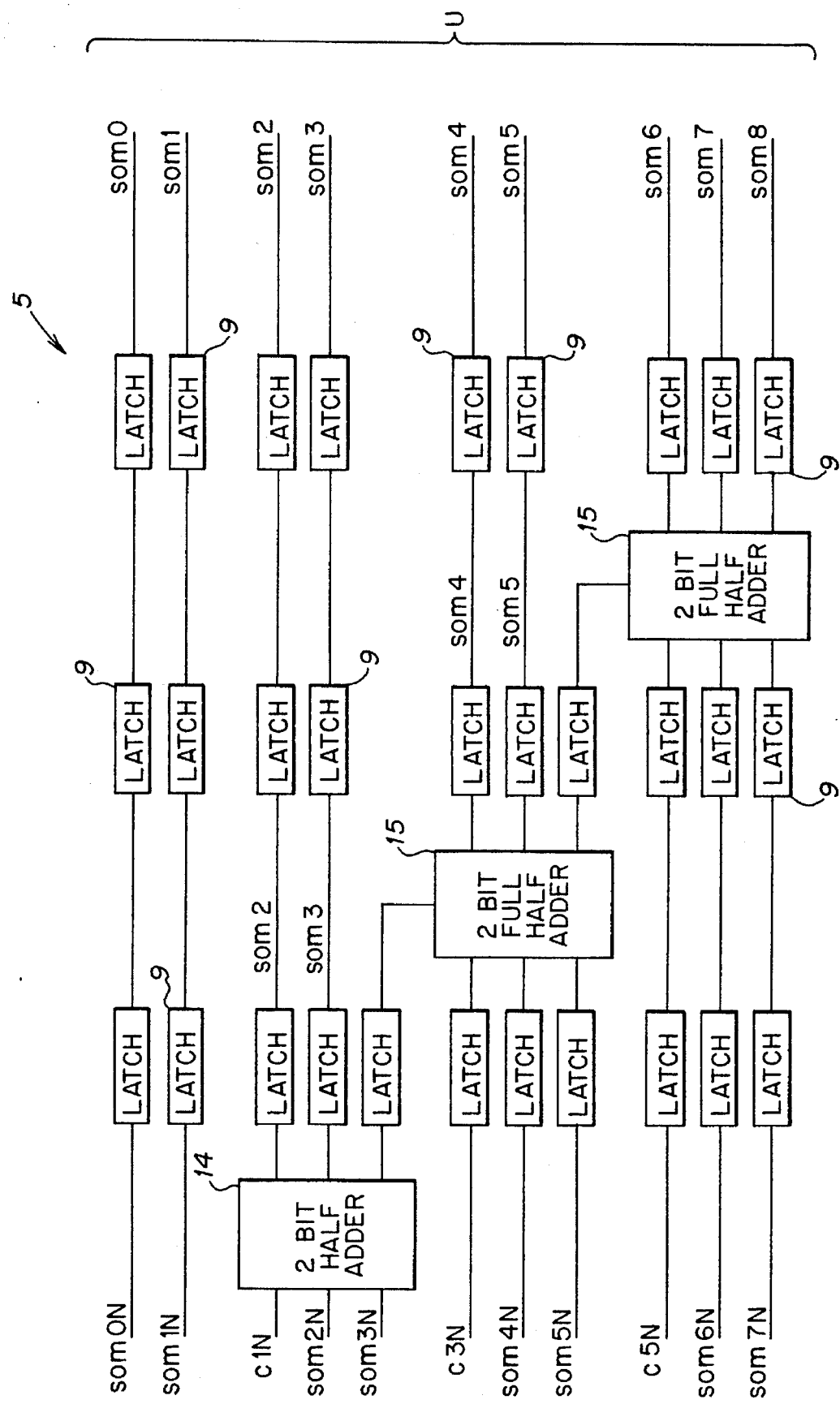

As shown in FIG. 8, block 5 includes a plurality of latches 9 connected in cascade in parallel rows. The number of the rows is essentially equal to n+1, with some additional and partial rows being provided for storing the various carries. The first two rows only include latches 9 and carry over on their outputs the values SOM0m and SOM1m of the least significant bits of the pseudosum computed in the last previous block 2. The second and third rows include, alternatively, an adder of the kind indicated at 14 in FIG. 6, being input the first and second bits of the second pseudo sum Som2N, Som3N as well as the first pseudocarry bit CIN. Two outputs of that adder are connected to two corresponding latches 9 containing the second group of two bits Som2, Som3 of the result of the sum operation to be carried over on the output U. A third output of adder 14 contains the carry which is provided to a successive adder of the kind indicated at 15.

With respect to the remaining rows, the block 5 has paired rows including an adder 15 whose location shifts by one place at each successive double row in order to be input the carry that appears on the output of the adder 14 or 15 immediately preceding it. In essence, the carry is propagated through one place at each clock impulse, and each bit of the final or partial sum and each carry are stored in the master-slave latches 9.

The operation of the adder chain according to the invention will be further described. It will be assumed, of course, that the scan rate for the transitions occurring within the circuit is provided by a clock signal.

A major advantage of the invention is that the carry from an elemental sum operation, that is performed on two bits only of the words to be added together, is propagated only once through the chain prior to being output. The internal logic of the adder blocks 2 uses, as data, the pseudosum somi and pseudocarry ci between homolog pairs of bits making up each of the words to be added together. As an example, if the binary number 101011 is to be added to another binary number, 101001, then the result can be set forth as groups of pseudosums, 00-00-00, each associated with a corresponding so-called pseudocarry: 1-1-1. The latter should obviously be shifted one place toward the most significant coding digits or bits.

The generic i-th block 2 will receive groups of two bits of the words Z and Y to be added together as well as the various pseudocarries from the pseudosums already completed in the preceding block. The final block 5 is instead relied upon to shift the pseudocarry one place toward the most significant bits of the pseudosum, consistently with the overall circuit timing. The carry from each elemental sum operation on four bits is propagated at each clock impulse. Each bit of the partial sum and each carry are stored in the master-slave latches 10 and 11. In some cases, and especially where the chain 1 is used in linear digital filters, the dual selection latches 11 may be overridden on command with the control signal Ctrl.

The chain 1 of this invention poses no operational problems to the duty rate because the time required by an adder FA to complete the summing of two bits plus the input carry is about 3–4 nsec, while the time taken by a latch 10 to record the result of the operation is about 3 nsec. Therefore, the overall delay will be approximately 6–7 nsec, i.e. less than one half that required by conventional devices. In addition, the silicon area requirements of an integrated circuit structure according to the invention will be uniquely smaller. The adder chain according to the invention has shown to operate at the highest frequencies anticipated of conventional digital filters. Further, the adder chain includes very simple and highly reliable basic components.

Having thus described one particular embodiment of the invention, various alterations, modifications, and improvements will readily occur to those skilled in the art. Such alterations, modifications, and improvements are intended to be part of this disclosure, and are intended to be within the spirit and scope of the invention. Accordingly, the foregoing description is by way of example only and is not intended as limiting. The invention is limited only as defined in the following claims and the equivalents thereto.

What is claimed is:

1. An adder chain for adding together at least first, second, and third digital words, each digital word having n bits, the adder chain comprising:

an initial block including:
n/2 two-bit adders, each two-bit adder receiving a two-bit portion of the first digital word and a two-bit portion of the second digital word for computing pseudosums and a pseudocarry for the received portions of the first and second digital words, and
storing means, coupled to the two-bit adders, for storing the pseudosums and pseudocarries, and for transmitting the pseudosums and the pseudocarries to a subsequent block of more significant order, wherein the storing means includes two sets of storage elements cascade connected to one another and coupled to the adders, one of the sets being coupled to a control signal for selective overriding; and at least one i-th adder block arranged in an order from a least significant block coupled to the initial block to a most significant block, where i is a natural number greater than 1, for receiving pseudosums and pseudocarries from a (i−1)th block and for receiving an (i+2)th digital word, for computing pseudosums and pseudocarries from the received pseudosums and pseudocarries and the received (i+2)th digital word; and a final block, receiving pseudosums and pseudocarries from the most significant adder block, including a plurality of adders and storage elements for selectively combining and storing the received pseudosums and pseudocarries and for providing an output word.

2. An adder chain as claimed in 1 wherein each adder includes a cell comprising two full adders.

3. An adder chain as claimed in claim 1 wherein each adder includes a cell comprising a half adder and a full adder.

4. The adder chain of claim 1, wherein the final block has (n/2)−1 two-bit adders, wherein two least significant bits are not provided to one of the (n/2)−1 two-bit adders.

5. The adder chain of claim 1, wherein each intermediate block includes n/2 two-bit adders for adding received pseudosums and pseudocarries and a first set of latches coupled to the adders for storing further pseudosums and pseudocarries.

6. The adder chain of claim 5, wherein each intermediate block further includes a second set of latches coupled to the first set, the second set of latches having a control input for receiving an override signal.

7. An adder chain as claimed in claim 1 wherein the final block includes:
a number of parallel rows of storage elements cascade connected to one another, the number of rows equal to a number of bits of the first and second digital words; and
at least one adder coupled to the storage elements in every row except for one row.

8. The adder chain of claim 1, wherein the final block includes:
(n/2)−1 two-bit adders, wherein two least significant bits are not provided to one of (n/2)−1 the two-bit adders, and
a plurality of latches connected to the two bit adders and the two least significant bits.

9. The adder chain of claim 8, wherein the plurality of latches of the final block are cascade connected in rows with the two-bit adders of the final block.

10. The adder chain of claim 9, wherein the two-bit adders of the final block are connected so that the two-bit adders execute serially.

11. The adder chain of claim 9, wherein the plurality of latches of the final block include at least one latch for containing each bit of the output word.

12. The adder chain of claim 11, wherein the plurality of latches of the final block are connected so that bits of the output word are simultaneously provided to the at least one latch for containing each bit.

* * * * *

UNITED STATES PATENT AND TRADEMARK OFFICE
CERTIFICATE OF CORRECTION

PATENT NO. : 5,471,413
DATED : November 28, 1995
INVENTOR(S) : Sali, et al

It is certified that error appears in the above-identified patent and that said Letters Patent is hereby corrected as shown below:

Title page, item [75] inventor: should read-- Mauro Luigi Sali --.

Signed and Sealed this

Sixth Day of February, 1996

Attest:

BRUCE LEHMAN

*Attesting Officer*  *Commissioner of Patents and Trademarks*

UNITED STATES PATENT AND TRADEMARK OFFICE
CERTIFICATE OF CORRECTION

PATENT NO. : 5,471,413
DATED : November 28, 1995
INVENTOR(S) : Mauro Iuigi SALI and Carla GOLLA It is certified that error appears in the above-indentified patent and that said Letters Patent is hereby corrected as shown below:

On the title page, Item 75,  SGS-Thomson Microeledtronics, S.r.I.
Agrate Brianza, Italy Signed and Sealed this Eighteenth Day of June, 1996

*Attest:*

BRUCE LEHMAN

*Attesting Officer*  *Commissioner of Patents and Trademarks*

UNITED STATES PATENT AND TRADEMARK OFFICE
CERTIFICATE OF CORRECTION

PATENT NO. : 5,471,413
DATED : November 28, 1995
INVENTOR(S): Mauro Luigi SALI and Carla GOLLA It is certified that error appears in the above-identified patent and that said Letters Patent is hereby corrected as shown below:

On the title page, Item [73], SGS-Thomson Microelectronics S.r.l.
Agrate Brianza, Italy This certificate supersedes Certificate of Correction issued June 18, 1996.

Signed and Sealed this

Twenty-fourth Day of September, 1996

Attest:

BRUCE LEHMAN

*Attesting Officer*     *Commissioner of Patents and Trademarks*